(12) United States Patent
Patel

(10) Patent No.: US 9,811,800 B1
(45) Date of Patent: Nov. 7, 2017

(54) CONTEXTUAL RECORDING OF SHIPMENT RECEIVING

(71) Applicant: Amazon Technologies, Inc., Reno, NV (US)

(72) Inventor: Pujan Patel, Ontario, CA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 14/040,240

(22) Filed: Sep. 27, 2013

(51) Int. Cl.
*G06Q 10/08* (2012.01)

(52) U.S. Cl.
CPC .................. *G06Q 10/087* (2013.01)

(58) Field of Classification Search
CPC .... G06Q 10/087; G06Q 10/08; G06F 3/0481; G06F 3/04842
USPC ............................................. 705/28; 235/385
See application file for complete search history.

(56) References Cited

U.S. PATENT DOCUMENTS

| | | | | |
|---|---|---|---|---|
| 5,832,171 A * | 11/1998 | Heist | ..................... | H04N 9/8233 386/241 |
| 7,016,865 B1 * | 3/2006 | Weber | ..................... | G06Q 30/00 705/26.5 |
| 8,793,806 B1 * | 7/2014 | Truong et al. | ................... | 726/27 |
| 8,816,855 B2 * | 8/2014 | Kreiner et al. | ............ | 340/572.1 |
| 8,823,798 B2 * | 9/2014 | Bernal | .......................... | 348/149 |
| 2004/0267640 A1 * | 12/2004 | Bong | ..................... | G06Q 10/08 705/28 |
| 2007/0226088 A1 * | 9/2007 | Miles et al. | ..................... | 705/28 |
| 2011/0022500 A1 * | 1/2011 | Scheinfeld | ............. | G06Q 20/12 705/27.2 |
| 2011/0137753 A1 * | 6/2011 | Moehrle | ................ | G06Q 30/02 705/27.1 |
| 2013/0094590 A1 * | 4/2013 | Laksono | ................ | H04N 19/44 375/240.25 |
| 2014/0143355 A1 * | 5/2014 | Berdis | ..................... | H04L 51/04 709/206 |

\* cited by examiner

*Primary Examiner* — Ryan Zeender
*Assistant Examiner* — Milena Racic
(74) *Attorney, Agent, or Firm* — Kilpatrick Townsend & Stockton LLP

(57) ABSTRACT

Methods and systems are described for inventory tracking using a contextual recording of an item being received into inventory. A recording may be taken by a recording device as an item is being received into inventory at a fulfillment center from, or on behalf of, a third party. As a worker at the fulfillment center processes the item, the recording device may capture the worker's actions. The recording may be further combined with contextual information related to the item and/or the actions performed by the worker as the item is received and processed. The resulting contextual recording may then be provided to the third party who provided the item to the receiving site. Using the contextual recording, the third party and/or an owner or operator of the receiving site may determine whether an inventory item was properly received.

18 Claims, 6 Drawing Sheets

CONTEXTUAL RECORDING OF SHIPMENT RECEIVING

BACKGROUND

With the rapid growth of the retail industry, inventory tracking has become an especially important part of any business strategy for a seller. As retailers and other sellers begin to shorten their inventory turn-around time, it has become even more critical for fulfillment centers to maintain control over the inventory of items that they store on behalf of a seller. As part of a fulfillment center's inbound item process, sellers want more visibility into where their inventory is at the fulfillment center at all times and how it is processed at the fulfillment center. Fulfillment centers also incur significant costs when issuing reimbursements to sellers for missing items, which costs are partly due to items not being received and processed into inventory at the fulfillment center correctly.

BRIEF DESCRIPTION OF THE DRAWINGS

Various embodiments in accordance with the present disclosure will be described with reference to the drawings, in which.

DETAILED DESCRIPTION

Figure 1:
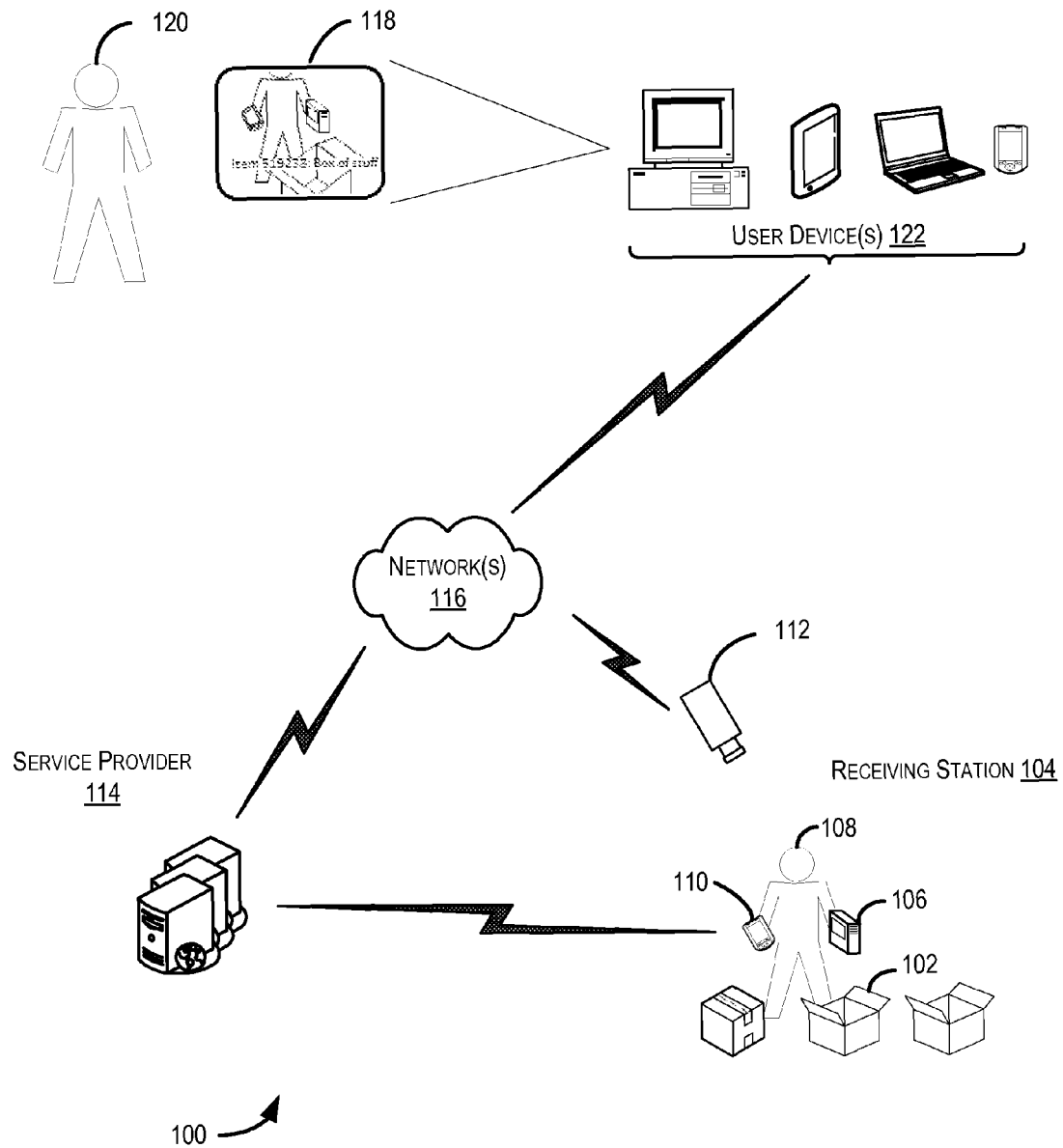
FIG. 1 is a pictorial diagram of an example network architecture for inventory tracking using a contextual recording at an inventory receiving station.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for providing inventory tracking using contextual video recording of an item being received into inventory. For example, a recording may be taken by a recording device (e.g., a video camera) as an item is being received into inventory at a receiving site (e.g., a fulfillment center) from, or on behalf of, a third party. The third party may be a retailer, merchant, seller, manufacturer, wholesaler, or any other entity that provides items to the receiving site. Accordingly, as a worker at the receiving site processes the item, the recording device may capture the worker's actions. The recording may be further combined with contextual information related to the item and/or the actions performed by the worker as the item is received and processed. The resulting contextual recording may then be provided to the third party who provided the item to the receiving site. Using the contextual recording, the third party and/or an owner or operator of the receiving site may determine whether an inventory item was properly received.

In some embodiments of the present disclosure, the third party sends a shipping container to the receiving site. As noted above, the third party may be a retailer, merchant, seller, manufacturer, wholesaler, or any other entity. Alternatively, the third party may be an entity that expects to receive items in the shipping container from the receiving site. A shipping container might be a box, a crate, envelope, tube or any other means of shipping items. Some examples of a receiving site may be a fulfillment center, warehouse, retail store, distribution center, or shipping transfer point. In some of these examples, the receiving site may be able to identify the third party associated with the shipping container by markings located either on the shipping container or on documents sent in conjunction with the shipping container. Some examples of these markings might be the name of the third party, an identifying number unique to that third party, a symbol associated with the third party, or a barcode that is associated with the third party. When a shipping container arrives at a receiving site, the third party associated with the shipping container may be notified of its arrival.

In some embodiments of the present disclosure, the receiving site might have at least one receiving station. A receiving station, for the purpose of this disclosure, is an area that is utilized for the processing of items received at the receiving site. For the purposes of this disclosure, processing a shipping container refers to performing at least one inventory action on the items contained within the shipping container. The processing of a shipping container may end when inventory actions have been performed on a portion, a set number, or all items in the shipping container, when a receiving site worker stops performing inventory actions on the items in the shipping container, or when the receiving station begins the processing of another shipping container, as examples. In some embodiments, when a shipping container is about to be processed in a receiving site, the third party associated with the shipping container may be notified of its impending processing. Alternatively, the third party could be notified concurrently with processing or afterwards.

In some embodiments, a receiving station may be fitted with a recording device such as a video camera, digital video camera, DVD-R camera, voice recorder, etc. The receiving station may also contain an input device that is capable of performing inventory transactions. Some embodiments of a receiving station may be set up to accommodate at least one receiving site worker, whereas other embodiments may be fully automated. In examples where a receiving site is set up to accommodate at least one receiving site worker, the identity of that receiving site worker may be obscured from the video camera. This may be accomplished by using techniques known to one skilled in the art, such as facial blurring, selective aiming of the camera, or voice distortion.

The inventory actions may include, but are not limited to, receiving items into inventory by removing items from the shipping container, inputting item identifying information in an inventory system, preparing the item for placement in inventory at the receiving site, etc.; removing items from inventory by preparing them for shipping; or transferring items between shipping containers. An item identifier may be used to associate an inventory transaction with a particular item. An item identifier may be a stock-keeping unit (SKU), model number, part number, Universal Product Code (UPC), standard identification number (SIN) or another type of item number and may, in some instances, be embodied in an optical code, such as a one- or two-dimension bar code, or an RFID tag. The item identifier can be input manually or it can be scanned in electronically, by using a scanner (such as a barcode reader). Scanning could be integrated into the recording device so that recording and scanning can occur simultaneously. Where an inventory action relates to a particular item, information related to that item may be retrieved from a catalogue source, such as an item data store. This information may include things such as item price, size, weight, color, description, quantity, or an image of the item for comparison. Contextual information, for the purposes of this disclosure, can include inventory action data and/or item information. In some examples, contextual information may be time-stamped. The contextual information may be combined or interleaved with a recording in real time, and/or it may be combined with a recording at a later time.

In embodiments of the present disclosure in which the receiving station contains a recording device, the recording device may record the receiving station for only the duration of the processing of each shipping container. Alternatively, the receiving station may be constantly recorded. In examples that involve a receiving station that is recorded for the duration of the processing, a worker may initiate the recording. In these examples, the recording may also be initiated automatically when the third party associated with the shipping container is identified. In examples that involve a receiving station that is constantly recorded, the recorded device may include a time index that can be used to match up the recording with inventory actions that are time-stamped. In these examples, the third party may be provided with only the recording pertaining to his or her items.

In some embodiments, a recording may be kept separate from the contextual information until it is accessed. In other embodiments, contextual information may be combined with a recording in real time, or as it occurs. In yet other embodiments, the contextual information may be combined with the recording after the shipping container has been processed, but before it is accessed. In some examples, the contextual information may be presented with the recording for a single item at a time. In other examples, the contextual information may be presented with the recording in the form of a rolling log.

In some embodiments, the third party may be provided streaming or download access to the recording over a network connection. In other embodiments, the recording might be kept on a computer readable storage medium, such as a CD-ROM, DVD, Secure Digital (SD) card, a flash drive, etc., which is given to the third party. Where a third party is able to access the recording over a network connection, security layers may be present. The recording may be available over a secure connection and/or the recording may be encrypted. In some examples, a third party may be able to perform a search to return related recordings. The recording may be searchable in that specific inventory actions or items are able to be located in the recording. In some examples, the third party may be required to use a login or create an account in order to access the recording. In some examples, the third party may be able to access the recording in real time and/or via an archive. In some examples, a third party may be restricted from accessing any recording that is not associated with it. For example, the third party may only be able to view those recordings that pertain to shipping containers sent by that third party. In some examples, multiple third parties may be able to access recordings simultaneously. Where multiple receiving stations are each processing shipping containers (or part of a single shipping container) associated with the same third party, the third party may be provided with multiple recordings simultaneously. By way of example, the third party may be presented with a split-screen view showing some or all of the receiving stations that are processing his shipping container(s).

FIG. 1 depicts an illustrative network architecture 100 in which techniques for inventory tracking using a contextual recording may be implemented. These techniques are described in more detail below in connection with at least FIGS. 2-6. Returning to FIG. 1, the illustrative architecture 100 applies to the receiving of shipping container(s) 102 at a receiving station 104 where a shipping container 102 may be processed by a worker 108 to accept one or more items 106 into inventory. The worker 108 may remove each item 106 from the shipping container 102 and input an item identifier for the item 106 into an inventory management system implemented by one or more service provider computers 114 using an input device 110. For example, the worker 108 may scan a bar code found on the item 106 using the input device 110 or may manually input the item identifier into the input device 110. A recording device 112 may be used to record these inventory actions of the worker 108 as they are performed. The recording device 112 and/or the input device may be in communication with a service provider computer 114 via a network 116 or via a direct wired or wireless communication link. In some embodiments, the service provider 114 may combine data from the recording device 112 with data from the input device 110. This can create a recording 118 containing contextual data. The service provider may also provide this contextual recording 118 (or a link to access the contextual recording 118) to a user 120 via the network 116. The user may be a representative of the third party who provided the shipping container 102. The user may then access the contextual recording 118 via a user device 122.

Figure 2:
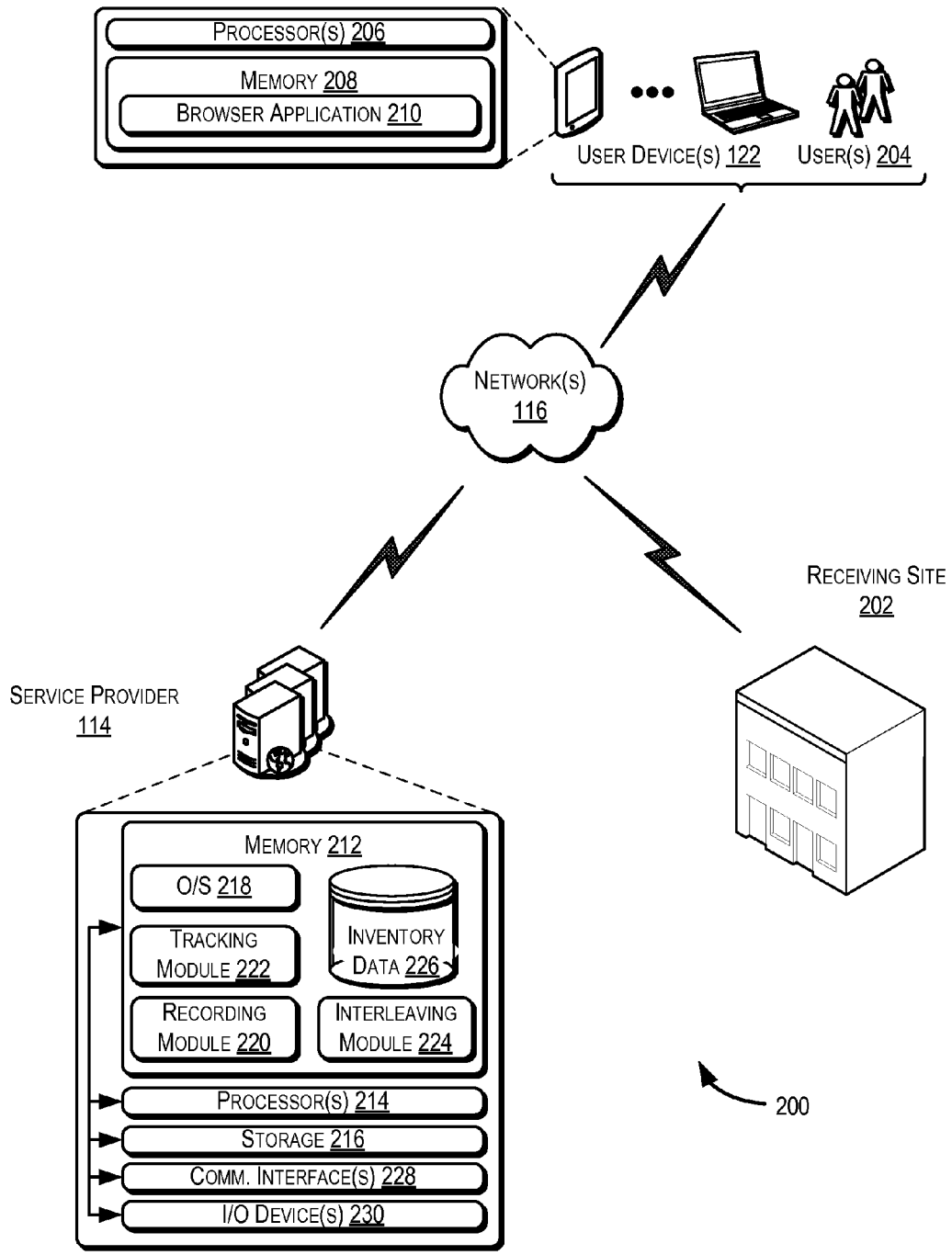
FIG. 2 is a pictorial diagram of an example network architecture for inventory tracking using a contextual recording at a receiving site, such as a fulfillment center.

FIG. 2 depicts an illustrative network architecture 200 in which techniques for inventory tracking using a contextual recording may be implemented at a receiving site. In some examples of this architecture 200, at least one receiving site(s) 202 may be in communication with one or more service provider computers 114 via a network 116. The receiving site(s) 202 may provide a recording of an item being received into inventor and contextual data to the service provider computers 114. The service provider computers 114 may then combine this data and provides access to the resulting contextual recording 118 over the network 116 to one or more users 203. Users 204 may be able to access the combined data over the network 116 via a number of user devices 122.

The user devices 122 may be any type of computing device such as, but not limited to, a mobile phone, a smart phone, a personal digital assistant (PDA), a laptop computer, a desktop computer, an electronic book reader, a gaming console or controller, a server computer, a thin client device, a tablet computer, etc. The user device 122 may include at least one processor 206 capable of processing a recording and displaying the contextual recording 118 to a user 204. The contextual recording 118 may be stored in memory 208 of the user device 202, or it may be streamed over the network 116. Where the contextual recording 118 is streamed over the network 116, it may be displayed using a browser application 210 or a media player application.

In some examples, the networks 116 may include any one or a combination of many different types of networks, such as cable networks, the Internet, wireless networks, cellular networks, and other private and/or public networks. The networks 116 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein. While the illustrated example represents the users 204 using the browser application 210 to access data via the networks 116, the described techniques may equally apply in instances where a user 204 interacts with service provider computers 114 via a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, the browser application 210 may allow the users 204 to interact with the service provider computers 114, such as to store, access, and/or manage data, develop and/or deploy computer applications, and/or access network content. These service provider computers 114 may be configured to host a network site (or combination of network sites) viewable via the user device 122. The browser application 210 may be capable of handling requests from many users 204 and presenting, in response, various user interfaces on the user device 122. The browser application 210 can provide access to any type of network site that supports user interaction, including social networking sites, electronic retailers, informational sites, blog sites, search engine sites, news and entertainment sites, and so forth. As discussed above, the described techniques can similarly be implemented outside of the browser application 210, such as with other applications running on the user device 204.

The service provider computers 114 may be any type of computing device such as, but not limited to, a mobile phone, a smart phone, a personal digital assistant (PDA), a laptop computer, a desktop computer, a server computer, mainframe computer, a thin-client device, a tablet computer, etc. Additionally, it should be noted that in some embodiments, the service provider computers 114 may be executed by at least one virtual machine implemented in a hosted computing environment. The hosted computing environment may include at least one rapidly provisioned and released computing resource, which computing resource may include computing, networking, and/or storage devices. A hosted computing environment may also be referred to as a cloud-computing environment. In some examples, the service provider computers 114 may be in communication with the user devices 222 via the networks 116, or via other network connections. The service provider computers 114 may include one or more servers, perhaps arranged in a cluster or as individual servers not associated with one another, or may be implemented as web services consumable via the networks 116.

In one illustrative configuration, a service provider computer 114 may include at least one memory 212 and at least one processing unit (or processor(s)) 214. The memory 212 may store program instructions, such as modules, that are loadable and executable on the processor(s) 214, as well as data generated during the execution of these programs. Depending on the configuration and type of the service provider computer 114, the memory 212 may be volatile (such as random access memory (RAM)) and/or non-volatile (such as read-only memory (ROM), flash memory, etc.). The service provider computer 114 may also include additional storage 216, such as either removable storage or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM) or ROM. Turning to the contents of the memory 212 in more detail, the memory 212 may include an operating system 218 and at least one application program or service for implementing the features disclosed herein including at least a recording module 220, a tracking module 222, and an interleaving module 224. The memory 212 may further include inventory data 226 with information related to items.

The memory 212 and the additional storage 216, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 122 or the service provider computer 114. The service provider computer 114 may also contain communications interface(s) 228 that allow the service provider computer 114 to communicate with a data store, another computing device or server, user terminals, and/or other devices on the networks 116. The service provider computers 114 may also include input/output (I/O) device(s) and/or ports 230, such as for enabling connection with a keyboard, a mouse, a pen, a voice input device, a touch input device, a display, speakers, a printer, etc.

Turning to the contents of the memory 212 in more detail, the memory 212 may include an operating system 218, a database containing inventory data 226 and the at least one application program or service for implementing the features disclosed herein including a recording module 220, a tracking module 222, and an interleaving module 224.

The recording module 220 may be configured to process recordings received from the receiving site 202. In some embodiments, the recording module may provide the third party with only those segments of the recording that are relevant to that third party. In some aspects of the present disclosure, the recording module 220 may store a complete recording obtained from the receiving site. In other aspects, the recording module 220 may divide the recording tracks, or segments that cover only a portion of the recording from the receiving site. Some aspects of the recording module 220 may store recording tracks that depict the processing of a single shipping container 102. The recording module 220 may also create and/or store relationships among recording tracks. By way of further example, the recording tracks that are associated with the same user 204 may be linked. A person skilled in the art would immediately recognize that this can be done in a variety of ways. Some examples of ways in which this can be accomplished are by storing an entry within a data store or by attaching metadata to the recording track. In some aspects, the recording module 220 may index the recording or recording track based at least in part on the time that it was recorded. Some non-limiting ways that a recording module 220 may grant access to a user 204 is that the access can be granted based on a stored relationship, or it may be granted based at least in part on an index attached to the recording (e.g., the third party may be granted access to a specific timeframe of the recording).

The tracking module 222 may be configured to process contextual information, including information regarding inventory actions received from the receiving site 202. In some aspects of the present disclosure, the tracking module 222 may create a log of contextual data. A log of contextual data may include a list of inventory transactions and/or item-specific information, such as item price, size, weight, color, description, quantity, or a picture of the item for comparison. Item specific information may be stored in a data store 226 of inventory data from which it may be retrieved. The log of contextual data may be a rolling log (one that scrolls up a screen as it grows) or it may consist of a series of single contextual data points.

The interleaving module 224 may be configured to combine the outputs of the recording module 220 and the tracking module 222. In some aspects of the present disclosure, the interleaving module 224 may interleave, or combine, the contextual output from the tracking module 222 with the recording that is being sent to the recording module 220. In these aspects, the recording that is received and processed by the recording module 220 may already contain contextual data provided by the tracking module 222. In some aspects, the interleaving module 224 may be configured to combine contextual data from the tracking module 222 with the recording from the recording module 220 in real-time. In some aspects, the interleaving module 224 may be configured to combine the outputs of the recording module 220 and the tracking module 222 on-demand. An example of a way that this can be accomplished is through the use of one or more time indices associated with the recording and the contextual data. In some aspects, the interleaving module 224 may be configured to combine the outputs of the recording module 220 and the tracking module 222 and store the resulting recording on a computer-readable storage media for later retrieval.

Figure 3:
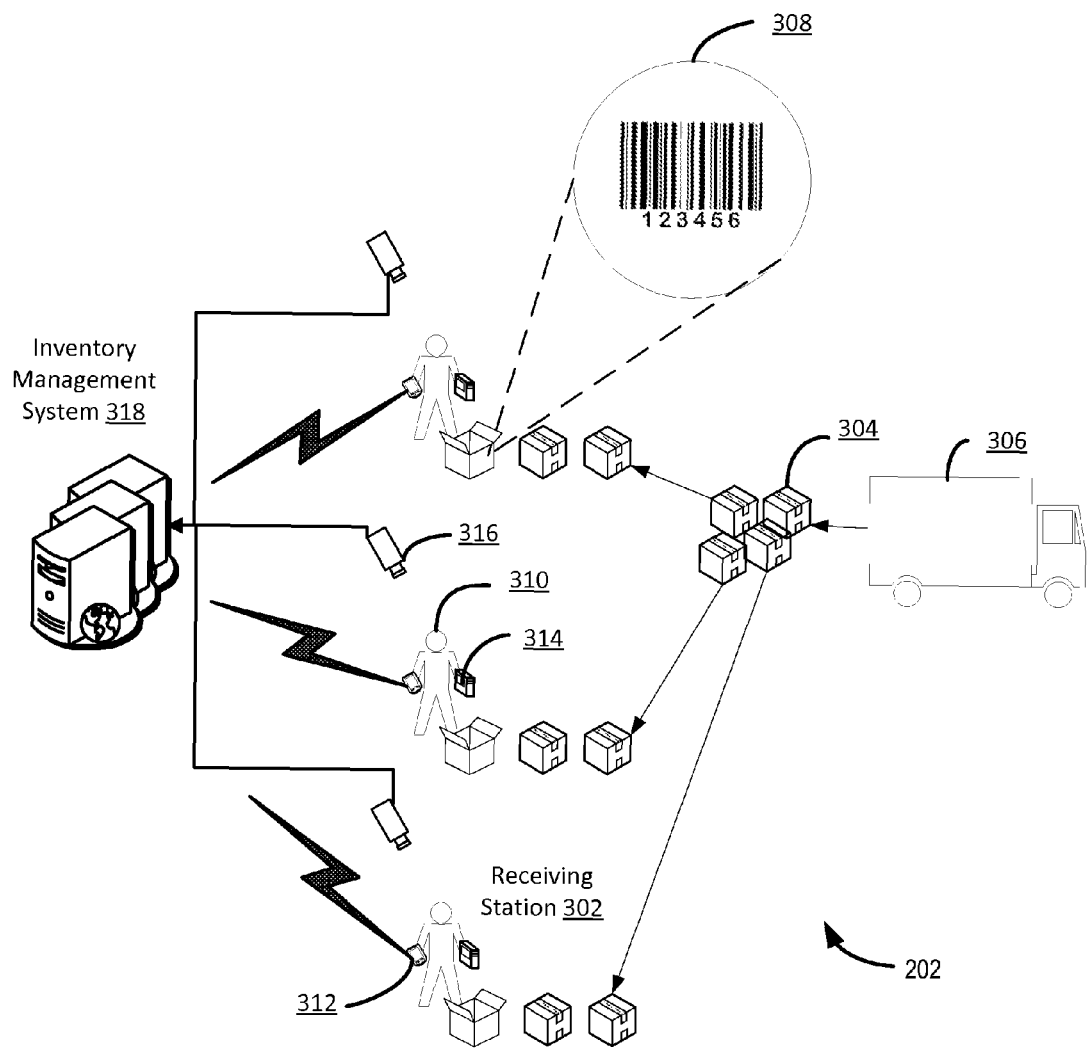
FIG. 3 is a pictorial diagram of an example network architecture for inventory tracking using a contextual recording within the receiving site.

FIG. 3 depicts of an example network architecture in which techniques for inventory tracking involving a contextual recording may be implemented within a receiving site 202. Some examples of a receiving site 202 may have one or more receiving stations 302. The receiving station 302 may receive a shipping container 304 that is delivered via a shipping method 306, e.g., via delivery truck. A shipping container 304 may contain an identifying marking 308 that can be used to identify the third party who sent the shipping container 304. At least one worker 310 at the receiving station 302 may identify the third party that is associated with the identifying marking 308. The worker 310 may then use an input device 312 to perform inventory actions on an item 314 found within the shipping container 304. For example, the worker 310 may scan a bar code found on the item 314 using the input device 312 or may manually input the item identifier into the input device 312. A recording device 316 may be used to record the inventor actions of the worker 310 at the receiving station 302. In some embodiments, the recording device 316 and/or the input device 312 are in communication with an inventory management system 318.

In some aspects, the receiving station 302 (e.g., such as the receiving station 104) may contain a table or workstation for receiving a shipping container 304. The receiving station 302 may also contain a conveyor belt or bins. Some receiving station(s) 302 may need to accommodate shipping containers 304 (e.g., such as the shipping container 102) that require the use of a forklift, pallet jack, or trolley to move, or that are delivered and/or removed by a robotic device. It is anticipated that a receiving station 302 may have many equivalent forms. In some aspects, the receiving station 302 may be equipped with a recording device 316. This recording device 316 may be a video camera that is located in a manner that makes it capable of recording items 314 as they are being processed by a worker 310. The recording device 316 may have a broad view of the receiving station 302, or it may be zoomed in to have a view of only the items 314 as they are processed.

In some aspects, the shipping method 306 used to receive shipping container(s) 304 may be a vehicle. By way of non-limiting example, a vehicle may include a truck, car, train, boat, or airplane. In some aspects, the shipping method 306 may be a conveyor belt or a mail delivery system. Those skilled in the art will recognize that the foregoing are non-limiting examples.

In some aspects, the identifying marking 308 may be used to identify the third party that sent the shipping container 304 having the identifying marking 308. The identifying marking 308 may be any marking that can be used to identify a third party and that is associated with the shipping container, such as a logo, a name, or an identifying number or other alphanumeric code. In some aspects, the identifying marking 308 may be located on the shipping container 304. In some aspects, the identifying marking 308 may be located on documents sent in conjunction with the shipping container 304, such as on a packing slip or in an email notification. In aspects where the identifying marking 308 is machine-readable (e.g., a barcode) an input device 312 may be configured to read or scan the identifying marking 308.

In some aspects, a worker 310 may be person employed at the receiving site 202. The worker 310 can work directly for the receiving site 202 or may be a contract or temporary employee. In some aspects, the worker 310 may be the intended recipient of the item(s) 314 located in the shipping container 304. For a more specific example of this aspect, a purchaser of an item may travel to a receiving site 202, where the purchaser can enter a receiving station 302 and take possession of his or her items 314. It is anticipated that in this situation, the purchaser would be considered a worker 310 for the purpose of this application. In some aspects, a worker 310 may also be a machine or other device, such as a robot, robotic arm or a conveyor belt. A receiving station 302 may be set up to accommodate more than one worker 310. Those aspects of the receiving station 302 that are set up to accommodate more than one worker 310 may also include more than one recording device 316 and/or more than one input device 312.

In some aspects, the input device 312 may be used to perform inventory actions on an item 304. The input device 312 may be any device capable of inputting item information. Item information may include an item identifier as described above. In some embodiments, an input device 312 may be a device that is capable of scanning a barcode, reading a radio-frequency identification (RFID) tag, or reading a Near Field Communication (NFC) chip. In some embodiments, an input device 312 may be a device that allows for manual input of an item identifier, such as a keyboard. It is anticipated that an input device 312 may have many other forms, and can be any device that permits the input of information manually or automatically. In some embodiments, the shipping container 304 or item(s) 314 within the shipping container 314 may contain an identification system component (e.g., such as an RFID tag or NFC chip). In these embodiments, the input device 312 may automatically detect the identification system component and perform an inventory action.

In some aspects, the inventory management system 318 is in communication with the recording device(s) 316 and/or the input device(s) 312. In some aspects, the inventory management system 318 may also be the service provider 114 depicted in FIGS. 1 and 2, whereas in other aspects, the inventory management system 318 may be in communication with the service provider 114. In some aspects, the inventory management system 318 may store a log of inventory actions that are received from the input device(s) 312. The inventory management system 318 may also store contextual information based at least in part on the inventory transaction and the item(s) 304 involved in that transaction. Moreover, the inventory management system 318 may store the recordings that are received from the recording device(s) 316. The inventory management system 318 may further combine at least part of a recording with at least some of the contextual information to form a contextual recording.

Figure 4:
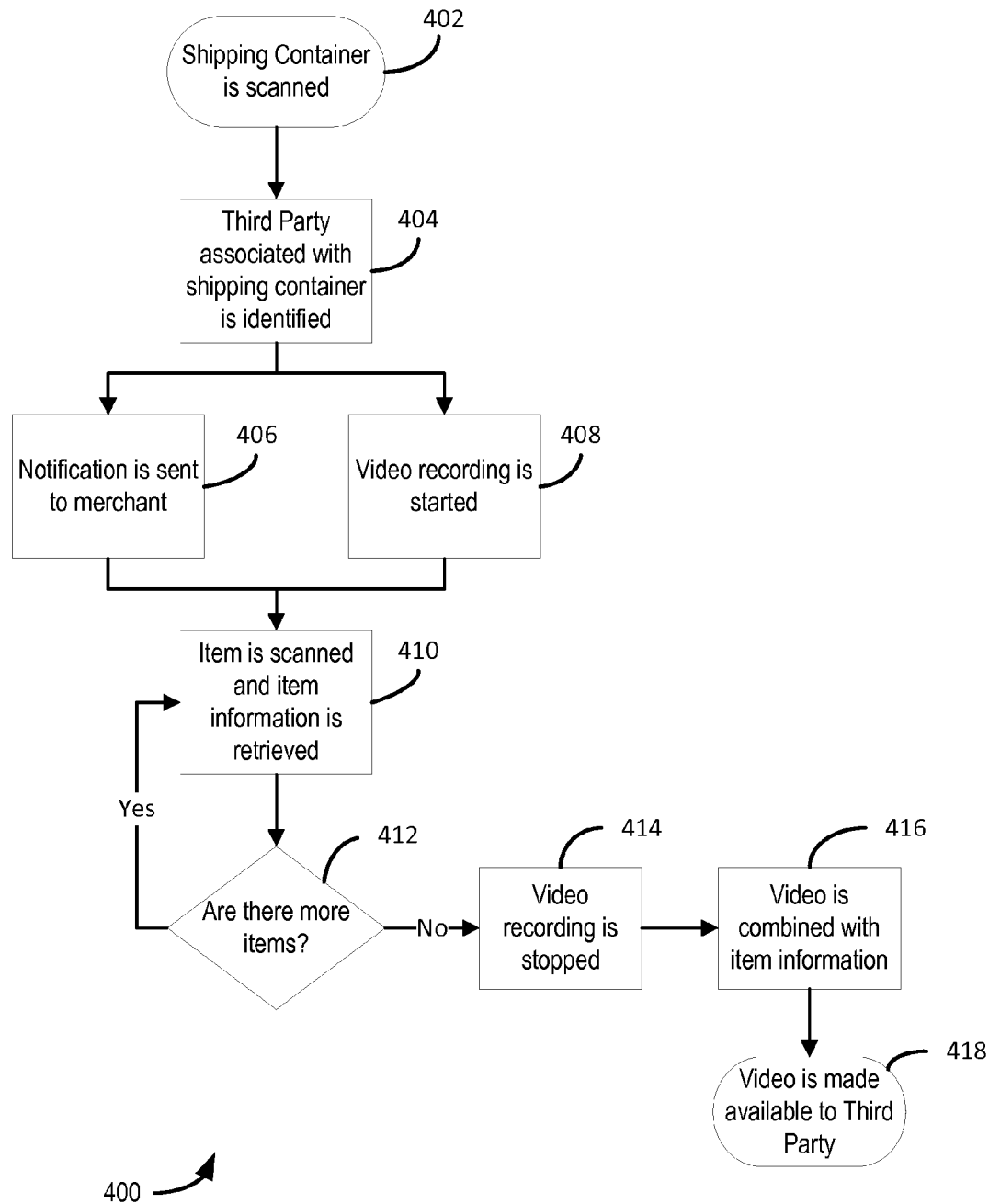
FIG. 4 is a flow diagram of an example process for inventory tracking using a contextual recording.

FIG. 4 illustrates a flow diagram showing an example process 400 for providing inventory tracking using a contextual recording. Some or all of the process 400 (or any other processes described herein, or variations and/or combinations thereof) may be performed under the control of one or more computer systems configured with executable instructions and may be implemented as code (e.g., executable instructions, one or more computer programs, one or more applications, or one or more modules) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. The receiving site worker(s) 310 shown in FIG. 3 and the one or more service provider computers 114 (e.g., utilizing at least one of the recording module 220 and/or the tracking module 222 and/or the interleaving module 224) shown in FIG. 2 may perform the process 400 of FIG. 4.

The process 400 may begin when a shipping container 304 is scanned at 402, e.g., by a worker 310 using an input device 312 a receiving station 302. The shipping container 304 may have a machine-readable identifying marking 308, such as a barcode, which associates the shipping container with a third party. At 404, the third party associated with the shipping container 304 is identified. At 406, the third party may be sent a notification that its shipping container is about to be processed. Simultaneously, at 408, a recording device, e.g., recording device 316, may begin recording the processing of the shipping container 402 by the worker. In alternate embodiments, the third party can be sent a notification after recording has started, or after a previously-recorded recording is available for viewing.

At 410 in process 400, at least one item 314 from the shipping container 304 may be scanned and information related to that item 314 may be retrieved from a data store. If there are more items to scan, 412 loops back to 410, where scanning and contextual information retrieval occurs on the next item. This process is repeated for each item 314 located within the shipping container 304. When no items are left, 412 branches to 414, where recording by the recording device 316 may be stopped. At 416, the recording may be combined with the contextual information retrieved at 410. At 418, the resulting contextual recording may then be made available to the third party identified at 404.

Figure 5:
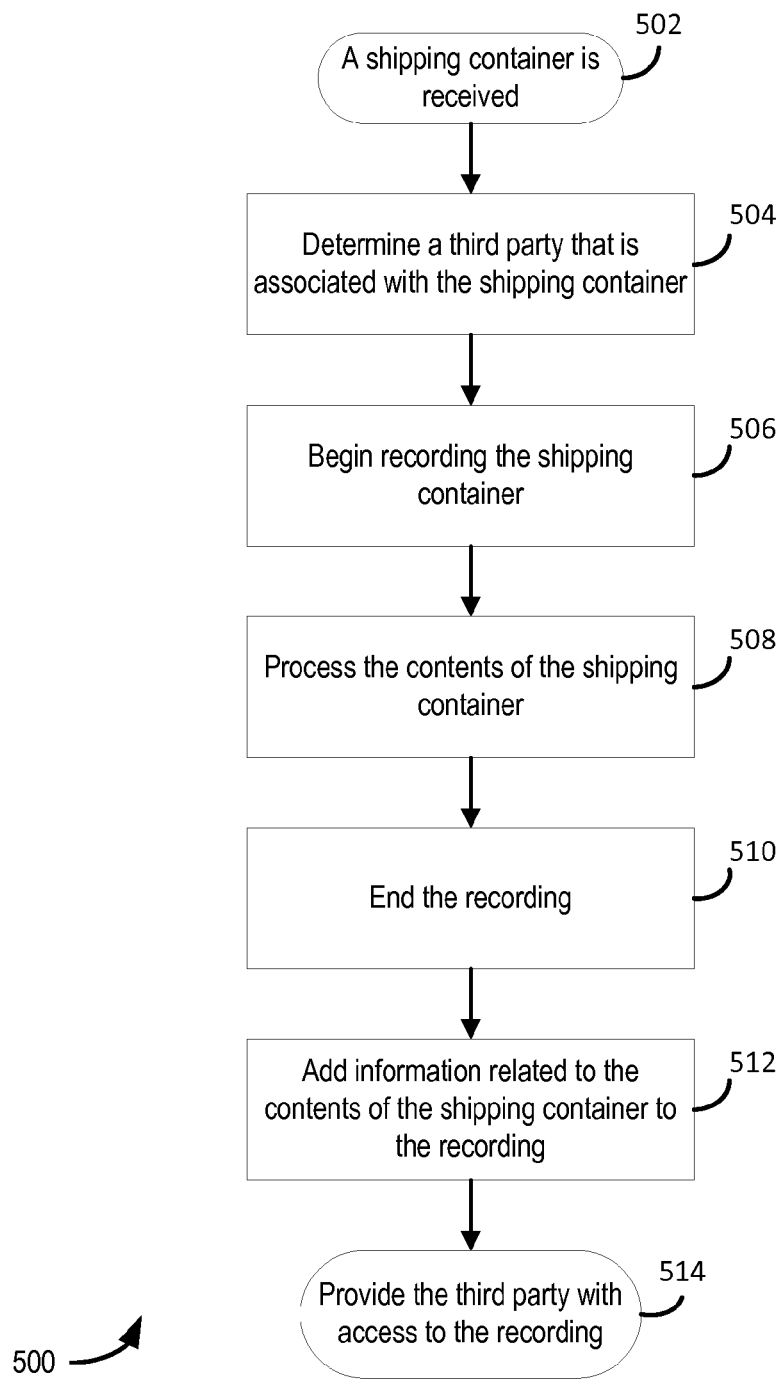
FIG. 5 is a flow diagram of another example process for inventory tracking using a contextual recording.
Figure 6:
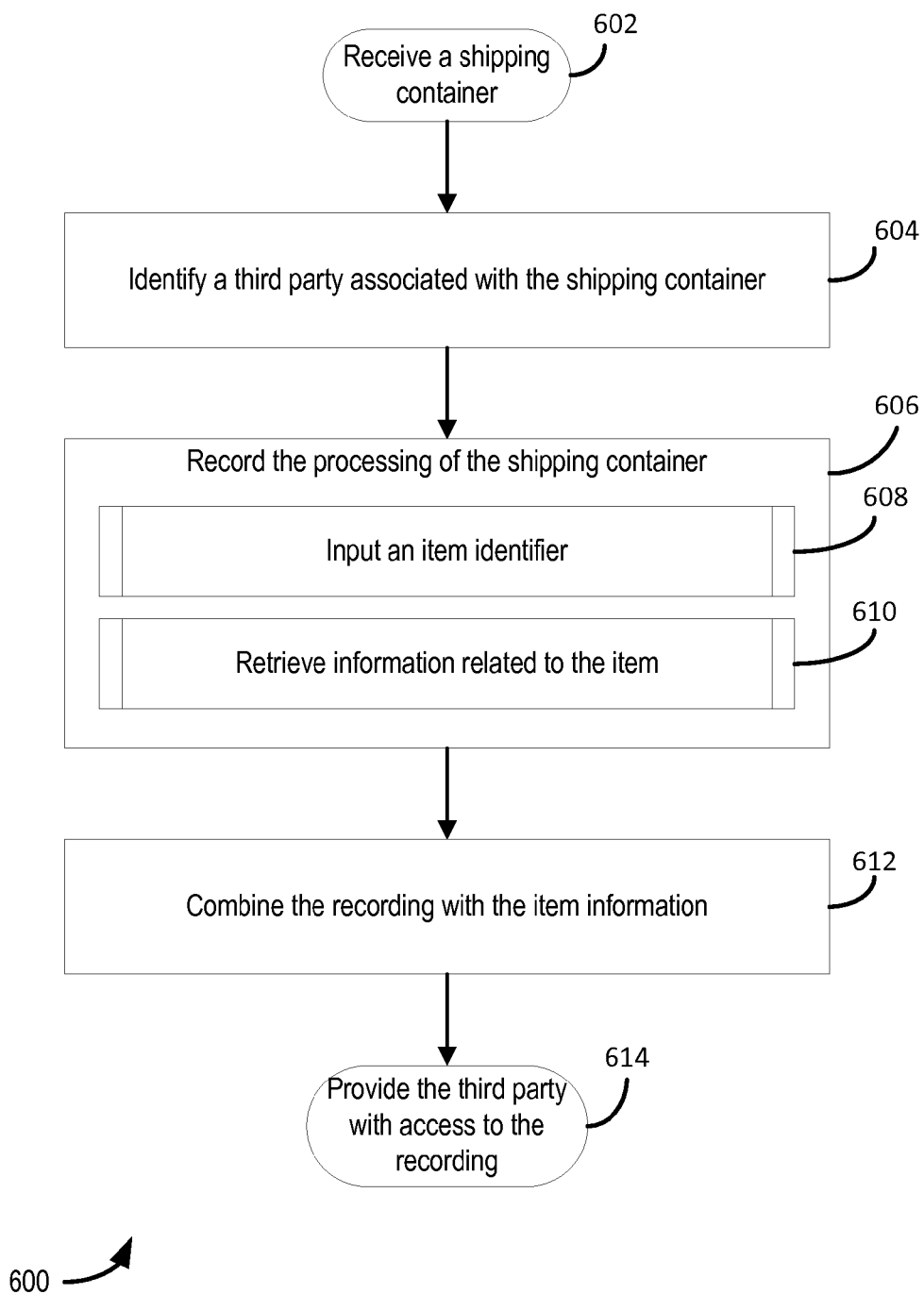
FIG. 6 is a flow diagram of a further example process for inventory tracking using a contextual recording.

FIGS. 5 and 6 illustrate example flow diagrams showing examples of other respective processes 500 and 600 for inventory tracking using a contextual recording. These processes are illustrated as logical flow diagrams, each operation of which represents a sequence of operations that can be implemented in hardware, computer instructions or a combination thereof. In the context of computer instructions, the operations represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

FIG. 5 illustrates a flow diagram of the example process 500. The receiving site worker(s) 310 shown in FIG. 3 and the one or more service provider computers 114 (e.g., utilizing at least one of the recording module 220 and/or the tracking module 222 and/or the interleaving module 224) shown in FIG. 2 may perform the process 500 of FIG. 5. The process 500 may begin when a shipping container 304 is received at 502, e.g., at a receiving station. At 504, the third party that is associated with the shipping container is then determined. The third party may be the entity that shipped the shipping container 304, or it may be an entity which expects to receive the contents of the shipping container 304. At 506, a recording device 316 is used to begin recording of the processing of the shipping container 304. At 508, the contents of the shipping container are processed. This may mean that an inventory action is performed on items 314 within the shipping container 304. Once processing is complete, the recording may be stopped at 510. At 512, the recording may then be augmented with contextual information related to each of the items 314 processed. At 514, the third party associated with the shipping container 304 may be provided with access to the augmented video.

FIG. 6 illustrates a flow diagram of the example process 600. The receiving site worker(s) 310 shown in FIG. 3 and the one or more service provider computers 114 (e.g., utilizing at least one of the recording module 220 and/or the tracking module 222 and/or the interleaving module 224) shown in FIG. 2 may perform the process 600 of FIG. 6. The process 600 may begin when a shipping container 304 is received at 602. At 604, a third party that is associated with the shipping container is identified. The processing of the shipping container is recorded at 606, e.g., using the recording device 316. As the shipping container 304 is processed, item identifiers are input for each item at 608. For each item identifier, contextual information is retrieved that is related to that item at 610. The contextual information is combined with the video recording at 612. The process 600 may involve repeating 606 through 612 until all items 314 within the shipping container 304 have been processed. At 614, the third party identified at 604 may be provided access to the recording.

Illustrative methods and systems for inventory tracking involving contextual video are described above. Some or all of these systems and methods may, but need not, be implemented at least partially by architectures such as those shown at least in FIGS. 2-6 above.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y or Z," unless specifically stated otherwise, is otherwise understood with the context as used in general to present that an item, term, etc., may be either X, Y or Z or any combination thereof (e.g., X, Y, and/or Z). Thus, such disjunctive language is not generally intended to, and should not, imply that certain embodiments require at least one of X, at least one of Y or at least one of Z to each be present.

Some embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
receiving, by a computer system, an indication about a shipping container arriving at a receiving station;
identifying, by the computer system, a third party associated with the shipping container received for inventory processing based at least in part on a machine readable identifier associated with the shipping container;
providing a notification to the third party that the shipping container is being processed;
receiving, by the computer system, contextual information about an inventory action performed on an item within the shipping container, wherein the contextual information comprises at least one of information related to the item or the inventory action performed on the item, the information related to the item comprising at least one of physical dimension information of the item, color information for the item, description information associated with the item, or quantity information associated with the item;
obtaining a video recording of the inventory action;
combining, by the computer system, first data from the video recording and second data from the contextual information by interleaving the first data and the second data, the combining based at least in part on time indices associated with the video recording and the contextual information;
creating, by the computer system, a contextual video recording of the inventory processing for the shipping container that comprises the first data and the second data, the creating of the contextual video comprising segmenting the contextual video into one or more segments and associating metadata with a portion of the one or more segments based at least in part on the identified third party, the metadata identifying a relationship between the one or more segments of the contextual video that are associated with the identified third party; and
providing, by the computer system, the identified third party with access to the portion of the contextual video recording, the third party being restricted from accessing other segments of the contextual video recording of the inventory processing that are not associated with the third party based at least in part on the metadata, and the contextual video recording being configured to enable the third party to search for the inventory action performed on the item within the shipping container associated with the third party.

2. The computer-implemented method of claim 1, wherein the inventory action is performed by a worker conducting the inventory processing for the shipping container at a receiving site.

3. The computer-implemented method of claim 2, wherein an identity of the worker is obscured in the video recording of the inventory action.

4. The computer-implemented method of claim 1, wherein the identified third party is provided streaming access to the contextual video recording.

5. A computer-implemented method comprising:
identifying, by a computer system, an association between a received shipping container and a third party based at least in part on a machine readable identifier associated with the shipping container, the machine readable identifier scanned at a receiving station;
providing a notification to the third party that the shipping container is being processed;
receiving contextual information about at least one of an inventory action performed on contents of the received shipping container, or the contents of the received shipping container, the contextual information about the contents of the received shipping container comprising at least one of physical dimension information of the contents, color information for the contents, description information of the contents, or quantity information of the contents;
obtaining a video recording of the inventory action performed on the contents of the received shipping container;
combining, by the computer system, first data from the received contextual information and second data from the video recording by combining the first data and the second data, the combining based at least in part on time indices associated with the video recording and the received contextual information;
creating, by the computer system, a combined video recording of the processing of the shipping container that comprises the first data and the second data, the creating of the combined video recording comprising segmenting the combined video recording into one or more segments and associating metadata with a portion of the one or more segments based at least in part on the time indices and the third party, the metadata identifying a relationship between the one or more segments of the combined video recording that are associated with the identified third party; and
providing the third party with access to the portion of the combined video recording, the third party is restricted from accessing other segments of the combined video recording of the processing of the shipping container that are not associated with the third party based at least in part on the metadata, and the combined video recording being configured to enable the third party to search for the inventory action performed on the contents of the received shipping container associated with the third party.

6. The computer-implemented method of claim 5, wherein combining the received contextual information with the video recording comprises embedding at least some of the received contextual information into the video recording.

7. The computer-implemented method of claim 5, wherein the inventory action performed on the contents of the received shipping container is locatable within the combined video recording.

8. The computer-implemented method of claim 5, wherein multiple third parties are provided with access to the combined video recording.

9. A system comprising:
a recording device configured to video record inventory processing of a shipping container; and
a computing device in communication with the recording device, the computing device configured to at least:
identify a third party that provided the shipping container based at least partly on an association between the third party and data collected by an input device from the shipping container;

notify the third party that the shipping container is being processed;

receive contextual information about the video recorded inventory processing from the recording device, the video recorded inventory processing associated with inventory processing of an item in the shipping container, the contextual information comprising at least one of physical dimension information of the item, color information of the item, description information of the item, or quantity information for the item;

combine first data from the video recorded inventory processing that is received from the recorded device and second data from the contextual information of the item by interleaving the first data and the second data, the combining based at least in part on time indices associated with the video recorded inventory processing and the inventory data;

create a combined video recording of the inventory processing of the shipping container that comprises the first data and the second data, the creating of the combined video recording comprising segmenting the combined video recording into one or more segments and associating metadata with a portion of the one or more segments based at least in part on the time indices and the third party, the metadata identifying a relationship between the one or more segments of the combined video recording that are associated with the identified third party; and provide the portion of the combined video recording to the third party, the third party being restricted from accessing other segments of the combined video recording of the inventory processing of the shipping container that are not associated with the third party based at least in part on the metadata, and the combined video recording being configured to enable the third party to search for the inventory processing of the item in the shipping container associated with the third party.

10. The system for providing inventory management of claim 9, wherein the recording device comprises a video camera.

11. The system for providing inventory management of claim 9, wherein the input device comprises at least one of a bar code scanner, a radio-frequency identification tag reader, or a near field communication chip reader.

12. The system for providing inventory management of claim 9, wherein the recording devices are located at a receiving station that receives the shipping container.

13. The system for providing inventory management of claim 9, further comprising a plurality of recording devices, wherein each recording device of the plurality of recording devices is configured to record inventory processing of a different shipping container.

14. A non-transitory computer-readable storage medium, storing computer executable instructions for providing inventory management that, when executed by a computer system, configures the computer system to perform operations comprising:

receiving, from an input device, an input of a first identifier associated with a shipment from a third party;

notifying the third party that the shipment is being processed;

receiving, from a recording device, a video recording of a receiving process for the shipment;

receiving, from the input device, an input of a second identifier associated with an item in the shipment; and retrieving, from a data store, based at least in part on the second identifier, contextual information related to the item, the contextual information related to the item comprising at least one of physical dimension information of the item, color information for the item, description information for the item, or quantity information for the item;

combining first data from the video recording with second data from the contextual information related to the item by interleaving the first data and the second data, the combining based at least in part on time indices associated with the video recording and the contextual information related to the item;

creating a combined video recording of the receiving process of the shipment that comprises the first data and the second data, the creating of the combined video recording includes segmenting the combined video recording into one or more segments and associating metadata with a portion of the one or more segments based at least in part on the time indices and the identified third party, the metadata identifying a relationship between the one or more segments of the combined video recording that are associated with the identified third party; and providing the identified third party with access to the portion of the combined video recording and the contextual information, the third party being restricted from accessing other segments of the combined video recording of the receiving process of the shipment that are not associated with the third party based at least in part on the metadata, and the combined video recording being configured to enable the third party to search for the receiving process for the shipment and the item in the shipment associated with the third party.

15. The non-transitory computer-readable storage medium of claim 14, wherein the first identifier identifies the third party.

16. The non-transitory computer-readable storage medium of claim 14, wherein the second identifier comprise at least one of a stock-keeping unit number, a universal product code, a model number, a part number, or a standard identification number.

17. The non-transitory computer-readable storage medium of claim 14, wherein the combined video recording comprises the video recording overlaid with a rolling log of the contextual information.

18. The non-transitory computer-readable storage medium of claim 14, wherein the video recording received from the recording device is time-stamped.

* * * * *